Oct. 18, 1938.  J. A. NICHOLS ET AL  2,133,753
AUTOGRAPHIC GUIDE
Filed July 8, 1938
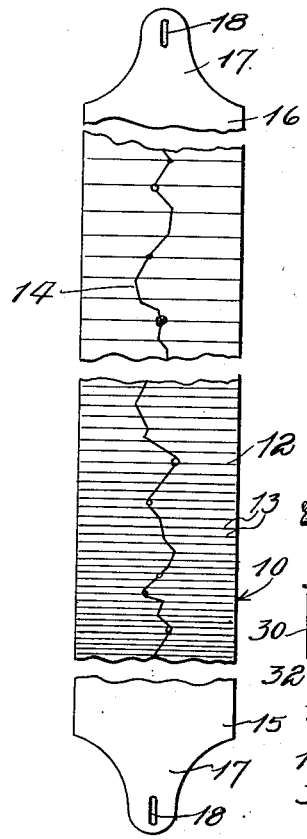
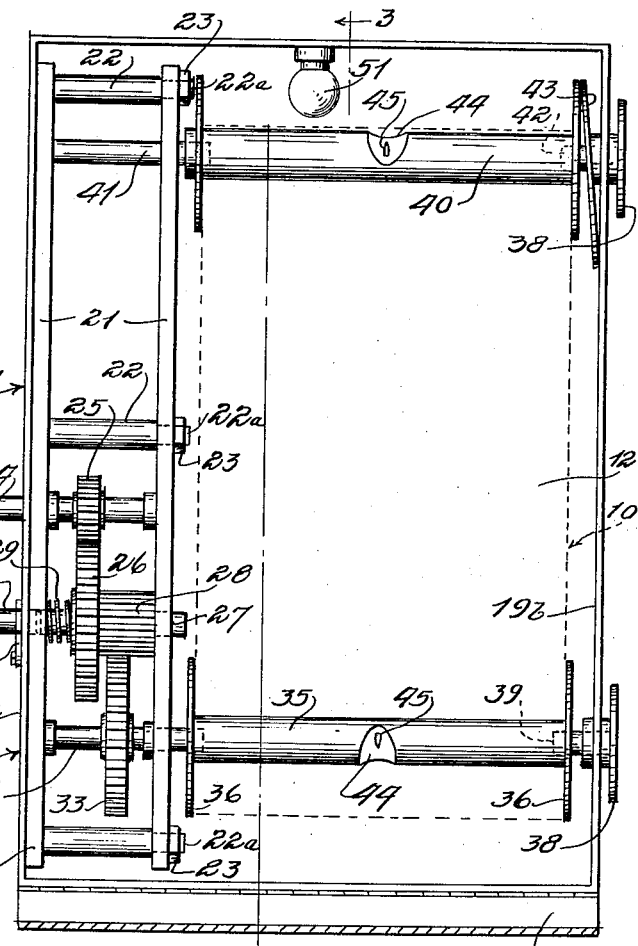
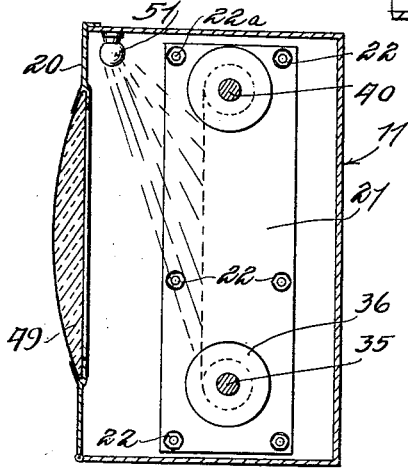
Inventors
JAMES A. NICHOLS,
WILLIAM E. FLANAGAN,
By
J. Clarkson  Attorney Patented Oct. 18, 1938

2,133,753

UNITED STATES PATENT OFFICE 2,133,753

AUTOGRAPHIC GUIDE

James A. Nichols and William E. Flanagan, Washington, D. C.

Application July 8, 1938, Serial No. 218,198

4 Claims. (Cl. 40—42)

This invention relates to road maps and reels therefor.

One important object of the invention is to provide a novel form of road map which will give a true indication of the distance travelled irrespective of the amount of the map wound on a winding reel.

A second important object of the invention is to provide a novel reeling device cooperating with such a map.

A third important object of the invention is to provide a novel form of reeling device wherein the winding reel forms the means for actuating the map and wherein this winding reel is so connected to one of the wheels of an automobile that a constant ratio exists between the distance travelled by the automobile and the number of revolutions of the winding reel.

A fourth important object of the invention is to provide such a construction of reeling mechanism that the winding reel may be operatively disconnected from the means driven by the vehicle and simultaneously arranged for manual operation at the will of the user.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a face view of a form of strip map forming part of this invention, the view being broken and showing only the end portions of the map.

Figure 2 is a face view of the casing holding the reeling mechanism for the map and the casing door being open and broken away to disclose the mechanism.

Fig. 3 is a reduced scale section on the line 3—3 of Figure 2.

Figure 4 is a face view of the instrument panel of an automobile and showing the invention as driven from a conventional speedometer.

In the embodiment of the invention as here disclosed there is shown a strip map 10 and a winding device 11 each of which is of peculiar construction to cooperate with the other.

The map 10 is in the form of a long ribbon like strip 12, of paper, or other suitable material, and on one face of the strip is a series of distance indicia here shown as transverse lines 13. It will be seen that the lines 13 are not uniformly spaced but that the distance between adjacent lines increases from one end of the strip to the other. These lines are crossed by the usual route line 14 common to strip maps but in the present instance having corresponding distances along the line less at one end than at the other in accordance with the distance indicia 13. It will thus be seen that the scale of the map and route line increases from the initial or starting end 15 of the map to the terminal end 16. Each end of the strip is provided with a tab 17 having a securing perforation 18 at its extremity. The purpose of this peculiar graduation of the map will be presently explained.

The winding mechanism, indicated in general at 11, includes a casing 19 open at the front and there provided with a door 20 here shown as hinged at the bottom although the invention is not to be restricted to any particular arrangement of casing or closure therefore. Fixed within the casing 19 is a gear supporting frame comprising a pair of parallel plates 21 which are secured in properly spaced relation by legs or struts 22, each of which is fixed at one end to one of the plates 21 and has its other end reduced and threaded as at 22 to extend through a suitable opening in the other plate 21. On the reduced ends are threaded nuts 23 which hold the plates together.

Extending through a wall 19a of the casing and journalled in the plates 21 is a drive shaft 24 whereon is fixed a gear 25. The gear 25 meshes with a gear 26 which is fixed on a shaft 27 journalled in the plates 21 and projecting through the wall 19a. On the shaft 27 is also fixed a drum gear 28 which is normally held against the inner plate 21 by a coiled spring 29 surrounding the shaft 27 between the outer plate 21 and the gear 26. The projecting end of the shaft 27 carries a combined knurled pull button and turning knob 30. The shaft 27 is provided with a pair of spaced annular grooves 31 and a spring pawl 32 is attached to the casing wall 19a and is positioned for selective engagement in the grooves 31 as the shaft 27 is pulled outwardly against the action of the spring 29 or moved inwardly to the normal position shown in Fig. 2. The drum gear 28 constantly meshes with a gear 33, fixed on a reel driving shaft 34, which is journalled in the plates 21 and projects through the inner plate 21. The projecting end of the shaft 34 is preferably of polygonal cross-section to engage, in the usual manner, in a corresponding opening formed in one end of the body 35 of a winding reel provided with end flanges 36. The casing 19 has a side wall 19b opposite the wall 19a. On the wall 19b is mounted a spring pressed pivot of the type employed in the ordinary film camera and, like the camera pivot, provided with a knob 38 by which the pivot may be retracted. This pivot 37 normally engages in a socket 39 formed in the remaining end of the body 35, but, when retracted, frees the winding reel so that it may be removed as desired. Above the winding reel is a second reel 40 which is normally held between a fixed pivot member 41 mounted in the plates 21 and a movable pivot 42 of the same type as the pivot 37 but which is surrounded by an arcuate leaf spring 43 which bears against the end of the storage reel and holds the latter yieldably from rotation. Each reel has a recess 44 centrally of its length to receive the end portion of one of the tabs 17 and in each recess is a prong 45 which engages through an opening 18 to prevent slipping of the map around the reel. The drive shaft 24 is suitably connected to a part of the automobile which rotates in constant ratio to the travel of the vehicle over a road. For instance, the drive shaft 24 is here shown as connected to the mileage indicator 46 of a speedometer 47, the casing 19 being mounted on the instrument panel 48 of the vehicle alongside of the speedometer. As is well known, automobile speedometers are generally geared to a front wheel of the vehicle through a flexible shaft and obviously the shaft 24 may be similarly actuated or in fact driven in any desired manner so long as a suitable constant ratio is obtained between the revolutions of the shaft 24 and the distance travelled by the automobile.

At the start of a trip the strip map is wound on the upper reel except for a sufficient length to span the distance between the reels and enable the lower prong 45 to engage in the opening 18 at the starting end of the map. In the door 20 is a sight opening through which a portion of the map between the reels may be observed. This sight opening is preferably fitted with a lens 49 to facilitate reading of the map and a suitable pointer or index 50 may be shown on the lens. With the map thus ready for the start of the trip the operator, if necessary, draws out the shaft 27 until the gear 26 is disengaged from the gear 25. He then rotates the shaft 27 until the starting point of the trip, as shown on the map, is brought into alinement with the index 50. Now the map is in position for coupling the reeling device to the drive shaft 24 which is done by moving the shaft 27 to its inner position, as shown in Fig. 2. When the automobile is started and moves along the route shown on the map the latter will be wound on the lower reel. Since the gearing for driving this reel is proportioned to the scale of the map the winding of the latter on the lower reel will cause the map to move past the index 50 in accordance with the distance travelled by the vehicle. Since the map is wound on the lower reel the effective diameter of the reel increases with each convolution of the map wound on the reel. Thus, if the body 35 is one-half inch in diameter and the map be wound thereon until the outer diameter of the roll of map amounts to one inch the next revolution of the reel will wind up twice the length of the map compared to that length wound on the bare body by its first revolution. Accordingly the scale of the map must constantly increase with each revolution of the reel in order to obtain a true reading of the distance travelled. Proper maps for this purpose may be prepared by the usual map makers or a person may prepare his own map by operating the device with the door 20 opened and a blank strip inserted for reeling, the strip being marked from time to time with such indications as the maker may deem advisable.

In case of detours the driving mechanism may be disengaged from the reel by disengaging the gear 26 as before explained, and the map may be adjusted if necessary in the same manner as at the start upon arriving at known check points.

A lamp 51 is used to illuminate the map at night.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In reeling means for strip maps forming motor vehicle road guides and the like, a casing, a pair of parallel plates in said casing, a driving shaft journalled in said plates and extending out of said casing for connection to a rotating part of the vehicle, a pinion fixed on said shaft, a driven shaft journalled in said plates in spaced relation to the driving shaft, a spur gear fixed on said driven shaft, an intermediate shaft journalled in said plates and slidable longitudinally through the plates, a gear fixed on said intermediate shaft normally meshing with said pinion and slidable with the shaft to move out of mesh with the pinion, a second gear fixed on said intermediate shaft and constantly meshing with the gear on the driven shaft in all portions of the intermediate shaft, a winding reel connected to the driven shaft to rotate therewith, and means to move said intermediate shaft to bring the first mentioned gear thereon into and out of mesh with said pinion.

2. In reeling means for strip maps forming motor vehicle road guides and the like, a casing, a pair of parallel plates in said casing, a driving shaft journalled in said plates and extending out of said casing for connection to a rotating part of the vehicle, a pinion fixed on said shaft, a driven shaft journalled in said plates in spaced relation to the driving shaft, a spur gear fixed on said driven shaft, an intermediate shaft journalled in said plates and slidable longitudinally through the plates, a gear fixed on said intermediate shaft normally meshing with said pinion and slidable with the shaft to move out of mesh with the pinion, a second gear fixed on said intermediate shaft and constantly meshing with the gear on the driven shaft in all portions of the intermediate shaft, a winding reel connected to the driven shaft to rotate therewith, a spring surrounding the intermediate shaft and urging the first gear thereon into mesh with said pinion, and manually operable means for moving said intermediate shaft against the action of said spring and thereby to unmesh the first gear on the intermediate shaft from the pinion.

3. In reeling means for strip maps forming motor vehicle road guides and the like, a casing, a pair of parallel plates in said casing, a driving shaft journalled in said plates and extending out of said casing for connection to a rotating part of the vehicle, a pinion fixed on said shaft, a driven shaft journalled in said plates in spaced relation to the driving shaft, a spur gear fixed on said driven shaft, an intermediate shaft journalled in said plates and slidable longitudinally through the plates, a gear fixed on said intermediate shaft normally meshing with said pinion and slidable with the shaft to move out of mesh with the pinion, a second gear fixed on said intermediate shaft and constantly meshing with the gear on the driven shaft in all portions of the intermediate shaft, a winding reel connected to the driven shaft to rotate therewith, means to move said intermediate shaft to bring the first mentioned gear thereon into and out of mesh with said pinion, and spring latch means engaging the intermediate shaft to yieldably hold the shaft in its gear meshing and unmeshing positions.

4. In reeling means for strip maps forming motor vehicle road guides and the like, a casing, a pair of parallel plates in said casing, a driving shaft journalled in said plates and extending out of said casing for connection to a rotating part of the vehicle, a pinion fixed on said shaft, a driven shaft journalled in said plates in spaced relation to the driving shaft, a spur gear fixed on said driven shaft, an intermediate shaft journalled in said plates and slidable longitudinally through the plates, a gear fixed on said intermediate shaft normally meshing with said pinion and slidable with the shaft to move out of mesh with the pinion, a second gear fixed on said intermediate shaft and constantly meshing with the gear on the driven shaft in all positions of the intermediate shaft, a winding reel connected to the driven shaft to rotate therewith, a spring surrounding the intermediate shaft and urging the first gear thereon into mesh with said pinion, manually operable means for moving said intermediate shaft against the action of said spring and thereby to unmesh the first gear on the intermediate shaft from the pinion, and spring latch means engaging the intermediate shaft to yieldably hold the shaft in its gear meshing and unmeshing positions.

JAMES A. NICHOLS.
WILLIAM E. FLANAGAN.